July 22, 1952
O. C. KENT
2,604,332
ADJUSTABLE FRONT AXLE FOR ROW CROP TRACTORS
Filed Jan. 11, 1947
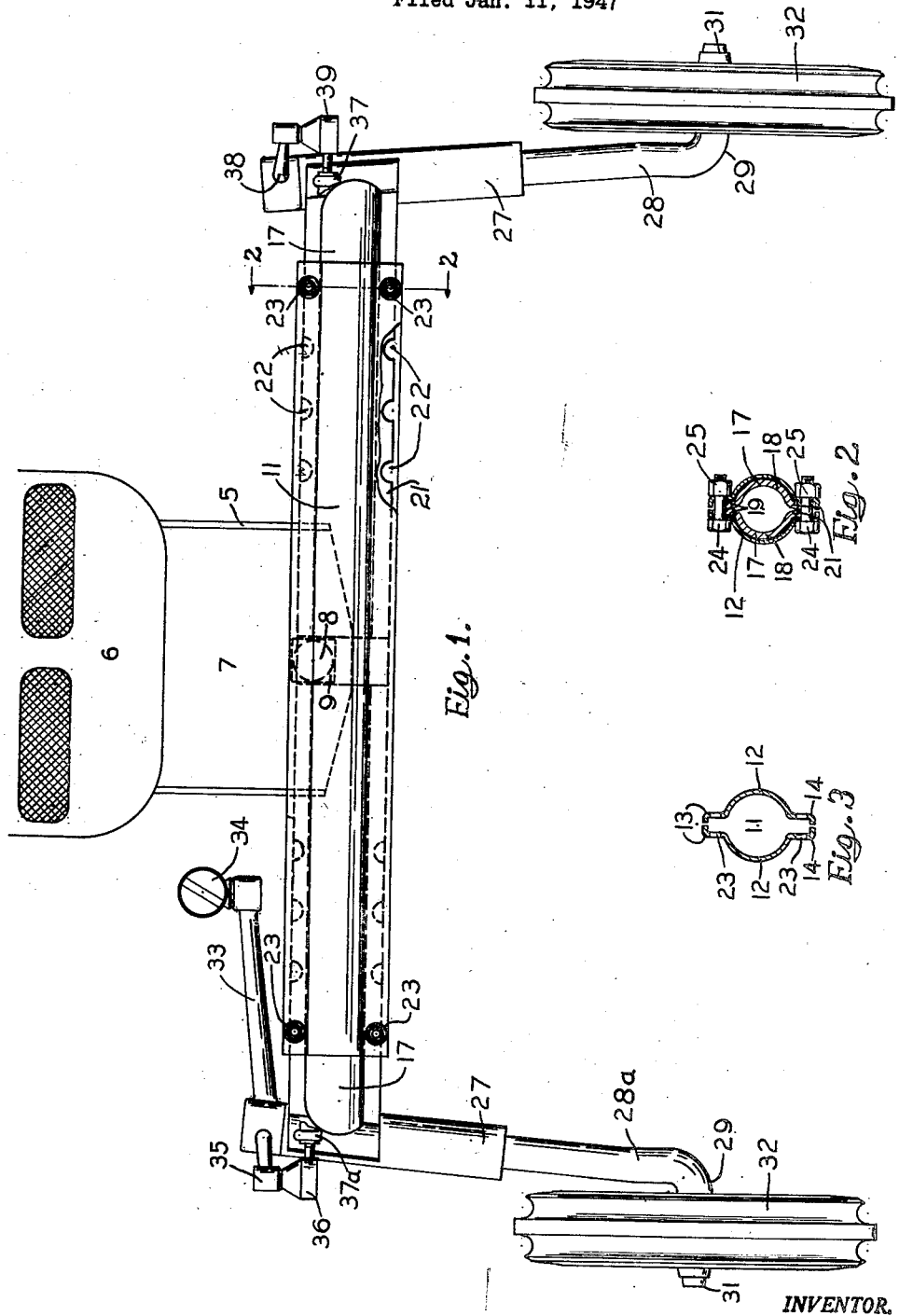
INVENTOR.
OWEN C. KENT
BY George Douglas Jones.
ATTORNEY Patented July 22, 1952

2,604,332

UNITED STATES PATENT OFFICE 2,604,332

ADJUSTABLE FRONT AXLE FOR ROW CROP TRACTORS

Owen C. Kent, Hollydale, Calif., assignor, by mesne assignments, to General Metals Corporation, a corporation of California Application January 11, 1947, Serial No. 721,495

3 Claims. (Cl. 280—34)

This invention relates to a tractor and more especially to an adjustable front axle for a row crop farm tractor.

In farm tractors of the row crop type it is essential to provide means for widening and narrowing the tread of the drive wheels where a three wheel tractor is concerned. A four wheel row crop tractor requires that both front and rear wheels be adjustable transversely, in order to travel between the plants in the rows.

The most common method of varying the width of the wheel tread on row crop tractors today is to arrange the wheels' hubs and tire rims in such manner that by reversing the wheels in relation to the hubs the tread may be widened or narrowed.

The rear wheel construction may be designed to accommodate such adjustment of width as above described; however, front wheel design and construction do not permit of such adjustment, and it is therefore necessary to design the front axle to provide for such adjustment.

Several designs of adjustable front axle construction are in use today, none of which can be quickly and easily made by the operator.

The present invention provides a novel and efficient means of adjusting for width the front tread of a row crop tractor, whereby the axle supporting the front wheels may be moved transversely of the tractor while supported within a housing therefor.

Other and further features of the invention will be more apparent to those skilled in the art, upon due consideration of the accompanying drawings and the following specification wherein is disclosed embodiments of the invention, it being understood that changes, modifications, and combinations of the figures may be made as fall within the scope of the appended claims without departing from the spirit of the invention.

In the said drawings:

Fig. 1 is a front elevational view of the adjustable front axle of a row crop tractor according to my invention.

Fig. 2 is a section of the front axle taken on lines 2—2 of Fig. 1.

Fig. 3 is a sectional view of the front axle housing.

Referring now to the drawings by numerals of reference wherein like numerals correspond to like parts:

The invention as disclosed in Fig. 1 of the drawings illustrates the front elevational view of a four wheel row crop tractor. The main frame 5 of the tractor supports a conventional power plant (not shown), having a radiator 6 forwardly thereof. A transverse plate 7, secured to the main frame, is provided with a journal (not shown) into which a horizontal king bolt 8 is placed. Adjacent the said plate 7 and in abutting relation is the axle housing support 9 which is rigidly secured to the axle housing 11, and is provided with suitable journal means through which the said king bolt 8 is inserted and secured in place by any suitable securing means.

The axle housing 11 is preferably formed in two parts, as best illustrated in Fig. 3. Each part is formed with an arcuate portion 12 and extending inturned flanges 13 and 14. The parts are positioned in opposed relation, forming a cylindrical member, and are rigidly secured together at the inturned flanged section, centrally of the extended end portions, and preferably by means of welds, or bolts, or the like. The outer portions of the said housing 11 are in spring apart relation; that is, when the said flanges 13—13 and 14—14 are welded or bolted together intermediate the ends thereof, as above stated. The remaining flanged portions are maintained in spaced apart relation. This spacing permits the axle 17, best illustrated in Fig. 1 and Fig. 2, to telescopically slide within the axle housing 12.

The axle 17 is constructed in similar form to the inner contour of the said axle housing 11, having arcuate portions 18 and flanged portions 19 and 21. The said flanged portions are in abutting relation and preferably welded along the entire seam to secure the two portions rigidly together.

Radial indents 22 are provided in the flanged portions 19 and 21, and which are oppositely disposed and in spaced apart relation.

It should be noted that the axles 17 terminate adjacent the king bolt 8 in order that the said axles may be independently moved outwardly or inwardly of the housing 11.

Adjacent the ends of the axle housing 11 and in the inturned flanged portions 13—13 and 14—14 are holes 23, best illustrated in Fig. 3. Bolts 24—24 are placed through the said holes, the said bolts being provided with nuts 25. The said bolts can only be placed within the said holes when one of the indents 22 is in register with the said hole 23. Therefore when the bolt is taken up the inturned flanges 13—13 and 14—14 are cinched together, clamping the axle 17 to the housing 11 and restraining the axles 17 from any axial movement.

The end of the said axles 17 are rigidly secured to conventional spindle housings 27, which provide a journal for the spindles 28 and 28a, which are formed at substantially right angles to the spindle as at 29 at their lower extremity, forming axles 31, to which are journaled conventional wheels 32.

The upper portion of spindle 28a is provided with a steering arm 33 which terminates inwardly in a ball member, to which the ball joint 34 is secured. The said joint 34 is connected to a drag link (not shown) which in turn is secured to a conventional steering means on the tractor.

Projecting outwardly from the steering arm and rigidly secured thereto and adjacent the spindle is a steering knuckle 35, the outer terminal of which is provided with a tie rod end 36, to which the tie rod 37a is secured. It should be here noted that the tie rod 37 is partially cut away in Fig. 1 to better illustrate the invention.

The spindle 28 is secured at its upper end to a steering knuckle 38. The end of the said knuckle projects octwardly and terminates in tie rod end 39, into which the end of the tie rod 37 is secured. The tie rod 37 telescopes into tie rod 37a and secured together by any conventional securing means, permitting the same to move outwardly or inwardly when the axles 17 are moved, thus maintaining the same steering relation at all times.

In the operation of the present invention the wheels 32 of the tractor are set at their innermost position and secured by means of bolts 25. When it is desired to widen the tread of the front wheels 32 of the tractor, the tractor should be elevated by means of blocks or a jack, placed centrally and under the axle housing 11. This will raise both front wheels clear of the ground. However, one wheel may be elevated if desired by blocks or a jack placed towards the wheel to be jacked and under the axle housing. One wheel may then be elevated. When the wheels or wheel is elevated, the nuts 25 are removed and the bolts 24 withdrawn; the two halves of the axle housing 11 then move apart slightly and the axles 17 may be freely moved outwardly to the desired position, which is only determined by the spacing of the indents 22, which must register with the holes 23 in the housing 11 before the bolts 24 may be inserted. When this is done the nuts 25 are replaced and the housing is drawn up snugly together. The axles 17 are then rigidly secured within the said housing and the wheels lowered to the ground and the tractor is now ready for operation.

It should be further noted that the drag link (not shown) is provided with the conventional screw and notched tie rod, which permits the same to be extended when desired, such as when the axles are moved outwardly or inwardly.

While the invention above described may appear to be a simple means of adjusting the tread of the wheels of the tractor, nevertheless such adjusting mechanism fills a long desired want of economically and easily adjusting the width of the tread of front wheels of row crop tractors.

What I claim as my invention is:

1. In a front axle for a tractor the combination of: a main frame, a hollow non-circular axle housing pivoted to the said main frame and provided with flanged sections in opposed relation, the housing having holes in the flanged sections adjacent the ends thereof, a pair of non-circular axles telescopically positioned within the said housing and slidable axially therein, the said axles being formed to be received in said housing and provided with flanged sections in oppositely disposed relation, a plurality of axially spaced radial indents in the last mentioned flanged sections, and means for securing the axles to the housing against axial movement, said means comprising bolts positioned in the said holes in the flanged sections of the housing and engaging the radial indents in the said flanged sections of the axles.

2. In a wheel tractor the combination of: a main frame, a pair of dirigible wheels at the front end of the main frame, a hollow non-circular axle housing centrally pivoted to the front end of the main frame, having flanged upper and lower portions, a pair of non-circular axles telescopically enclosed within the said housing, one of the wheels being mounted upon each of the axles, the said axles having flanged top and bottom portions, and a plurality of axially spaced radial indents therein, the said axle housing having an interior contour slightly larger and of the same form as the outer contour of the said axles, the housing having apertures in its flanged portions and adjacent the ends thereof, means to secure the said axles within the said housing comprising bolts in the said apertures engaging the said indents.

3. In a front axle construction for a tractor, the combination of an axle housing centrally pivoted on the tractor, the housing comprising a pair of longitudinal juxtapositioned elements cooperating to define a non-circular enclosure, said elements each having parallel flanged portions connected by outwardly curved arcuate side portions, a pair of wheel supporting axles slidably and non-rotatably mounted in said housing and extending into opposite ends of said enclosure, the axles each having axially spaced indents, and means on said flanged portions for clamping said elements together about the axles, said clamping means including transverse elements received within said indents to prevent longitudinal movement of the axles.

OWEN C. KENT.

REFERENCES CITED

The following references are of record in the file of this patent:

UNITED STATES PATENTS

| Number | Name | Date |
|---|---|---|
| 489,487 | Lohges | Jan. 10, 1893 |
| 1,224,262 | Bird | May 1, 1917 |
| 1,242,500 | Wilcox | Oct. 9, 1917 |
| 1,243,401 | Griswold | Oct. 16, 1917 |
| 1,321,107 | Kidney | Nov. 11, 1919 |
| 1,443,972 | Bowden | Feb. 6, 1923 |
| 1,642,502 | Krasberg | Sept. 13, 1927 |
| 1,706,543 | Rance | Mar. 26, 1929 |
| 1,937,839 | Parrett | Dec. 5, 1933 |
| 1,946,738 | Gulan, Sr., et al. | Feb. 13, 1934 |
| 1,967,283 | Brown | July 24, 1934 |
| 1,993,458 | Sintz | Mar. 5, 1935 |
| 2,173,419 | Johnson | Sept. 19, 1939 |
| 2,232,549 | McNamara | Feb. 18, 1941 |
| 2,247,725 | Ferguson | July 1, 1941 |
| 2,345,351 | Maxon et al. | Mar. 28, 1944 |